Aug. 18, 1925.
O. V. HUNT
1,550,614
BEARING
Filed Nov. 25, 1924
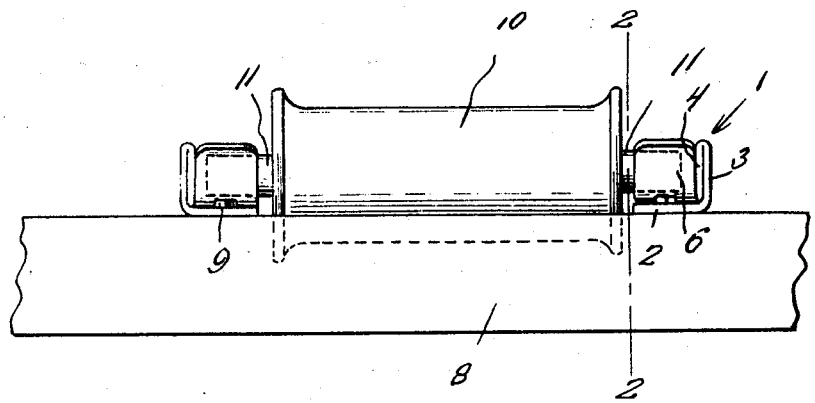
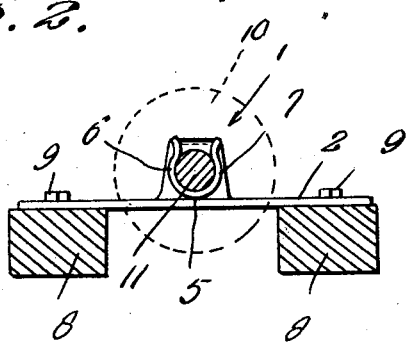
O. V. Hunt,
Inventor
By Clarence A. O'Brien
Attorney Patented Aug. 18, 1925.

1,550,614

UNITED STATES PATENT OFFICE.

OREN V. HUNT, OF FLORENCE, COLORADO.

BEARING.

Application filed November 25, 1924. Serial No. 752,193.

*To all whom it may concern:*

Be it known that I, OREN V. HUNT, a citizen of the United States, residing at Florence, in the county of Fremont and State of Colorado, have invented certain new and useful Improvements in a Bearing, of which the following is a specification.

This invention relates to improvements in bearings which are particularly adapted to be used for supporting the trunnions of a roller, the bearing being of such construction as to permit the trunnion of the roller to be readily and easily disengaged therefrom when the roller becomes worn and the same must necessarily be replaced with a new one.

A bearing of the above mentioned character, is particularly adapted to be used in coal mines and especially on a slope. A steel cable connected with the mine car is adapted to travel over a series of such rollers and with the bearings now in use for the trunnions of these rollers, considerable difficulty is experienced in removing the rollers from the bearings and furthermore considerable time is spent in interchanging the rollers. Furthermore, the steel cable has a tendency to tear out the bearings for the trunnions of the rollers thereby causing the displacement of the rollers.

My improved bearing overcomes the above disadvantages and will permit the trunnions of the rollers to be detachably supported and further held against accidental disengagement.

A still further object is to provide a bearing of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of the bearing embodying my invention showing the same in use, and Figure 2 is a sectional view taken approximately on line 2—2 of Figure 1.

In the drawing, wherein for the purpose of illustration is shown the preferred embodiment of my invention, the numeral 1 designates generally my improved bearing and the same is formed of a single piece of flat spring metal. The numeral 2 denotes the base portion of the bearing and extending upwardly from one of the side edges of the base at the intermediate portion thereof for a short distance is the strip 3. The strip 3 is then bent back upon itself as illustrated at 4, and the end 5 is bent to extend across the base in the manner clearly illustrated in Figure 1.

A pair of lateral extensions 6 and 7 are formed on the opposite sides of the end of the strip and these extensions are bent upwardly in such a manner as to provide a pair of cooperating spring arms, the upper ends of the extensions being arranged in diverging relation.

The base 2 is adapted to extend across a pair of adjacent ties shown at 8 and any suitable fastening means such as is illustrated at 9 is employed for securing the ends of the base on the spaced ties. It is of course to be understood that two of these bearings are used in connection with each roller 10, and the trunnions 11 on the respective ends of the roller 10 are adapted to be detachably supported in the socket formed by the end of the strip and the spring arms associated therewith in the manner clearly illustrated in the drawing.

The bearing embodying my invention is of such construction as to permit the trunnion to be readily inserted or removed therefrom without necessitating the loss of any considerable length of time or labor and furthermore when the trunnions of a roller are in position in the bearing, the same are held against accidental displacement therefrom.

While I have shown the preferred embodiment of my invention, it is to be understood that various changes in the size, shape and arrangement of parts may be resorted to without departing from the spirit of the invention and the scope of the appended claim.

Having thus described my invention, what I claim is:—

A bearing for a roller trunnion formed from a single piece of material and comprising a base portion, a strip extending upwardly from one of the side edges thereof for a short distance and then bent back upon itself, the end of the strip being bent to extend across the base, and lateral extensions on the opposite sides of the end of the strip, said extensions being bent to provide a pair of cooperating spring arms for detachably receiving the trunnion.

In testimony whereof I affix my signature.

OREN V. HUNT.